United States Patent Office 3,432,573
Patented Mar. 11, 1969

3,432,573
OLEFINS AND PROCESS FOR
PURIFYING THEM
Karl Diether Keil, Neuenhain, Taunus, Germany, assignor to Farbwerke Hoechst Aktiengesellschaft vormals Meister Lucius & Bruning, Frankfurt am Main, Germany, a corporation of Germany
No Drawing. Filed Sept. 27, 1966, Ser. No. 582,231
Claims priority, application Germany, Sept. 30, 1965,
F 47,317
U.S. Cl. 260—683.15        10 Claims
Int. Cl. C07c 7/00, 3/10

ABSTRACT OF THE DISCLOSURE

In a process for the polymerization of olefins having from 2 to 4 carbon atoms wherein an olefin monomer is polymerized in the presence of a catalyst, the improvement comprising employing as the monomer an olefin purified by contacting said olefins with reduced basic copper carbonate precipitated on a kieselguhr carrier.

---

The present invention provides olefins and a process for purifying them.

In the known processes of low-pressure polymerization of olefins, small amounts of impurities in the monomer generally cause considerable troubles. In many cases, it is therefore necessary to purify as carefully as possible the olefins to be polymerized. The olefins may be purified according to the following processes: A treatment with adsorbents, such as silicic acid, aluminum oxide and/or iron oxide or with active charcoal silica gel, alumina, aluminum oxide and/or molecular sieves. It is also possible to treat the olefins with organometallic compounds as well as with polymerization catalysts under conditions which do not lead to a polymerization.

Particularly suitable for removing the oxygen from the olefins is their treatment with reduced copper oxide. It is furthermore known to purify gases, in particular ethylene, with the aid of a special copper-magnesium-silicate catalyst which may be reduced. For preparing this known special catalyst, magnesium silicate is precipitated in the presence of copper compounds, or the copper compounds are precipitated on freshly precipitated magnesium silicate while simultaneously adding compounds of alkaline earths, zinc, cadmium or other heavy metals. The preparation of such a highly active catalyst is very complicated and expensive.

In addition, when olefins are purified according to this method which is preferably carried out at elevated temperatures, undesired side reactions occur, for example, dimerization of the ethylene yielding butenene or oligomerization yielding oils. These results considerably reduce the activity of the catalyst. In the regeneration, the oil obtained is then difficult to remove. This fact is of disadvantage for a process on an industrial scale, in which high throughputs of olefin per catalyst amount have to be achieved.

It has now been found that olefins containing from 2 to 4 carbon atoms can be purified at pressures up to 50 atmospheres and at temperatures ranging from —20° to +80° C. by treating them with a catalyst precipitated on a carrier material and consisting of reduced basic copper carbonate, the carrier material consisting of kieselguhr. The catalyst to be used according to the invention can advantageously be applied for purifying an olefin obtained from a cracking or refining plant, in particular, for purifying ethylene.

The same purifying effect is obtained with the help of copper-kieselguhr-catalysts which are prepared by precipitating in known manner basic copper carbonate with soda from, for example, a copper sulfate solution and then mixing it with kieselguhr while, if desired, adding binders such as bentonite, as well as finally reducing the mixture with hydrogen. It is also possible in the preparation of the catalysts to add known and usual additives of alkaline earth metal salts and salts of heavy metals which, however, increase the purifying effect only slightly. An advantageous purifying catalyst is, for example, a catalyst which contains, in an aqueous suspension or a paste, precipitated basic copper carbonate mixed with kieselguhr and magnesium carbonate in such a ratio that the copper content is 15–25% by weight and the magnesium content is about 1.5–2% by weight. The copper-kieselguhr-catalyst is prepared and reduced according to methods which are not provided by the present invention, in such a way that black finely distributed copper is present on the carrier material. For example, when basic copper carbonate is precipitated on pumice and then reduced, red inactive copper forms which does not have any purifying effect on the olefins nor has reduced basic copper carbonate without kieselguhr as a carrier.

The copper-kieselguhr-catalysts used according to the invention for purifying olefins have such a low oligomerization activity which does not produce, or only an extremely slight, dimerization and oligomerization of the olefins at room temperature, but which to a considerable extent removes CO, $N_2O$, $CO_2$, $C_2H_2$, $C_2H_6$ and $CH_4$, in particular oxygen. The purifying effect cannot be established analytically, in particular by gas chromatography, even at a detection limit descending to 1–10 p.p.m. of the various possible impurities. The purifying effect becomes, however, obvious by an increased yield of polymerizate obtainable with a certain amount of the Ziegler-catalyst, as compared to the unpurified monomer. Thus, by treating the olefins according to the present invention, it is possible to use a certain amount of catalyst for a prolonged period in the polymerization.

According to the present invention, the olefins are purified at the lowest possible temperatures ranging from —20 to +80° C., preferably at 10–30° C., and at pressures in the range of from 1 to 50 atmospheres, preferably 5–10 atmospheres gage. The purifying effect is obtained even up to very high throughputs of olefin in the range of from 1 to 4 parts, preferably 0.1–3 parts by weight of olefin per hour and per 1 part by weight of copper-kieselguhr-catalyst containing 15–20%, preferably 18–21% by weight of copper. The life of the catalyst is comparatively long, on account of the small amount of the impurities. When the catalyst is exhausted, a fact which can be seen from decreasing yields of polymerizate per unit of catalyst, it is regenerated by reduction or oxidation with oxygen as well as by subsequent reduction carried out in known manner.

The following examples illustrate the invention, but they are not intended to limit it thereto.

EXAMPLE 1

(a) Eethylene is used which is obtained from a cracking plant and containing impurities in amounts of only a few p.p.m. of oxygen, carbon oxide, dinitrogen oxide, carbon dioxide, acetylene, ethane and methane as well as of some other unknown components being at or below the detection limit. This ethylene is passed at room temperature and at a pressure of 7 atmospheres gage over a catalyst reduced in known manner at 190° C. with hydrogen and consisting of basic copper carbonate on kieselguhr (prepared according to Houben-Weyl, Meth. der org. Chemie, vol. 4, second edition, page 182), at a charge of 1 kg. of ethylene per hour and per kg. of catalyst. For polymerization, 0.5 liter of purified hexane is saturated with the ethylene thus purified in a stirring autoclave having a capacity of 1 liter. After 0.71 ml. of aluminum triethyl (5 millimols) and a dilute suspension of 0.01 millimol of titanium trichloride in hexane have been added, ethylene is introduced while stirring under a pressure of 6 atmospheres gage for 90 minutes at 85° C. After this period, the yield of polymerizate amounts to 70 grams which correspond to 4.6 kg. of polyethylene per 1 millimol of titane trichloride per hour.

(b) The comparative test without the purification of ethylene is carried out in the way described under (a). After a period of 90 minutes, there are obtained 40 grams of polymerizate corresponding to a yield of 57% referred to that of (a).

EXAMPLE 2

(a) To the basic copper carbonate precipitated from a copper sulfate solution with the aid of sodium carbonate, kieselguhr and magnesium carbonate are added in such an amount that the dried catalyst mass contains about 20% of copper and 2% of magnesium, whereto usual binders such as bentonite, water glass or polyvinyl alcohol may be added in view of better forming. After the catalyst has been reduced with hydrogen at 190° C. until the formation of water completely ceases, ethylene originating from a cracking plant is passed over at room temperature and at a pressure of 7 atmospheres gage at a charge of 1.5 kg. of ethylene per hour and per 1 kg. of copper catalyst and is conducted to a stirring autoclave having a capacity of 150 liters. 100 liters of pure hexane are saturated with this purified ethylene and after 28.2 ml. of aluminum triethyl (200 millimols) and 1 millimol of a titanium trichloride suspension in hexane have been added, the purified ethylene is introduced while stirring at a pressure of 6 atmospheres gage for 6½ hours at 85° C. After this period, about 70% of the ethylene amount which has been absorbed at the beginning, are polymerized and the autoclave contains 35 kg. of polymerizate corresponding to 5.3 kg. per hour.

(b) The comparative test is simultaneously carried out in a parallel polymerization plant without purification by means of a copper-kieselguhr-catalyst, in the manner described under (a). After a period of 4½ hours, the absorption of ethylene decreases to 20% of the initial absorption. There are obtained 11 kg. of polymerizate corresponding to 2.4 kg. per hour.

EXAMPLE 3

Polymerization is carried out in the manner described under 2(a) with the use of 1 millimol of titanium trichloride and 200 millimols of aluminum triethyl in 100 ml. of hexane at a pressure of 6 atmospheres gage. First, ethylene freed from impurities is introduced into an autoclave at a charge of 2 kg. of ethylene per hour and per kg. of purifying catalyst. At a constant pressure, the absorption of monomer decreases to 90% of the initial absorption within 2 hours.

For comparison's sake, the initial monomer is directly used for polymerization without being purified by a copper-kieselguhr-catalyst. Within 1 hour, the ethylene absorption decreases to 40% of the initial absorption.

Comparative tests (a) Ethylene is passed over a reduced commercial copper-magnesium-silicate-catalyst (BTS-catalyst of the firm BASF (Badische Anilin-&-Soda-Fabrik)) at 120° C. and at a maximum charge of 0.5 part by weight of ethylene per 1 part by weight of catalyst per hour at a pressure of 7 atmospheres gage. After this treatment, up to 1300 p.p.m. of butene-1, up to 300 p.p.m. of trans-butene-2 and 200 p.p.m. of cis-butene-2 can be established by gas chromatography, substances which have not been present in the starting olefin. The polymerization carried out according to Example 2 with the use of ethylene treated as described above, does not provide an increased yield of polymerizate as compared with the test carried out without a preliminary treatment.

(b) Ethylene is passed over a reduced commercial copper-magnesium-silicate-catalyst described under (a) at room temperature and at a charge of 1:1 at a pressure of 7 atmospheres gage. Butene-1 and butene-2 can be established by gas chromatography in amounts of up to 400 p.p.m.

(c) 1 kilogram of reduced commercial copper-magnesium-silicate-catalyst as described under (a), over which there has been passed 10 kg. of ethylene at 120° C. and 20 kg. of ethylene at room temperature, is oxidized with a mixture of nitrogen and oxygen at 140° C., for short periods at temperatures of up to 220° C., and subsequently reduced with a mixture of nitrogen and hydrogen or with hydrogen. In this process, a mixture of water and oil is expelled from the column, the organic portion of the mixture is 2 grams.

EXAMPLE 4

Ethylene is passed over copper-kieselguhr-magnesium carbonate catalyst reduced at 190° C., at room temperature and at a pressure below 7 atmospheres gage and at a charge of up to 1 kg. of ethylene per kg. of catalyst and per hour. In contradistinction of the copper-magnesium silicate catalyst, butene-1 and butene-2 can be established, at the beginning, by gas chromatography only in traces of up to a maximum of 10 p.p.m. and after a short period of charge, they cannot any longer be detected. In the regeneration by oxidation and subsequent reduction, after 300 kg. of ethylene per kg. of catalyst have been passed over, no oil could be expelled.

I claim:
1. In the process for the polymerization of olefins having from 2 to 4 carbon atoms wherein an olefin monomer is polymerized in the presence of a catalyst, the improvement comprising employing as the monomer an olefin purified at a pressure of up to 50 atmospheres and at a temperature ranging from $-20°$ to $+80°$ C. by treating said olefins with a contact material consisting of a reduced basic copper carbonate precipitated on a kieselguhr carrier material.

2. In the process for the polymerization of 1-olefin having from 2 to 4 carbon atoms wherein an olefin monomer is polymerized in the presence of a catalyst, the improvement comprising employing as the monomer an olefin purified by passing said olefin at a pressure ranging from 1 to 50 atmospheres and at a temperature in the range of from $-20°$ to $+80°$ C. with a throughput in the range of from 0.05 to 4.0 kilograms of olefin per kilogram of contact material per hour over a copper contact material reduced with hydrogen at a temperature in the range of from 150° to 250° C. and precipitated on a carrier material of kieselguhr which contains up to 15% by weight of alkaline earth metal salts and up to 2% by weight of bentonite as a binder.

3. The process of claim 1, wherein the contact material used for the purification contains 15 to 25% by weight of copper, 10 to 15% by weight of magnesium carbonate, 1.5 to 2% by weight of bentonite and 58 to 73.5% by weight of kieselguhr as the carrier material.

4. A process of claim 1, wherein the contact material used for the purification contains 18–21% by weight of copper, 1.5–2.5% by weight of magnesia, 1.5–2.5% by weight of bentonite and 71.5–89.0% by weight of kieselguhr as the carrier material.

5. A process of claim 1, wherein the 1-olefin is purified at a pressure ranging from 5 to 10 atmospheres and at a temperature ranging from 10 to 30° C.

6. A process of claim 1, wherein the throughput of 1-olefin in the purification amounts to 0.1 to 3.0 kilograms of 1-olefin per kilogram of contact material per hour.

7. A process of claim 1, wherein the throughput of 1-olefin in the purification amounts to 0.1 to 2.0 kilograms of 1-olefin per kilogram of contact material per hour.

8. A process of claim 1, wherein, instead of bentonite, water glass is used as a binder for the contact material.

9. A process of claim 1, wherein, instead of bentonite, polyvinyl alcohol is used as a binder for the contact material.

10. A process of claim 1, wherein no alkaline earth metal salts are added to the contact material.

References Cited
UNITED STATES PATENTS

| | | | |
|---|---|---|---|
| 1,738,971 | 12/1929 | Storch | 252—457 |
| 2,381,707 | 8/1945 | Wood et al. | 260—677 |

DELBERT E. GANTZ, *Primary Examiner.*

J. D. MYERS, *Assistant Examiner.*

U.S. Cl. X.R.

252—457; 260—677, 681.5